United States Patent
Kim et al.

(10) Patent No.: US 8,521,090 B2
(45) Date of Patent: *Aug. 27, 2013

(54) SYSTEMS, METHODS, AND APPARATUSES FOR REDUCING INTERFERENCE AT THE FRONT-END OF A COMMUNICATIONS RECEIVING DEVICE

(75) Inventors: Andrew Joo Kim, Atlanta, GA (US); Yunseo Park, Atlanta, GA (US); Seongmo Yim, Marietta, GA (US); Youngsik Hur, Atlanta, GA (US)

(73) Assignee: Samsung Electro-Mechanics, Gyunngi-Do (KR)

( * ) Notice: Subject to any disclaimer, the term of this patent is extended or adjusted under 35 U.S.C. 154(b) by 619 days.

This patent is subject to a terminal disclaimer.

(21) Appl. No.: 12/731,840

(22) Filed: Mar. 25, 2010

(65) Prior Publication Data
US 2011/0171922 A1     Jul. 14, 2011

Related U.S. Application Data

(60) Provisional application No. 61/293,319, filed on Jan. 8, 2010.

(51) Int. Cl.
*H04B 1/00* (2006.01)
*H04B 1/44* (2006.01)

(52) U.S. Cl.
USPC ......... 455/63.1; 455/67.13; 455/83; 455/296; 455/307

(58) Field of Classification Search
USPC ............... 455/63.1, 67.11, 67.13, 232.1, 295, 455/296, 307, 78, 83; 375/346, 350
See application file for complete search history.

(56) References Cited

U.S. PATENT DOCUMENTS

| | | | |
|---|---|---|---|
| 5,847,603 A * | 12/1998 | Myer | 330/52 |
| 6,539,204 B1 | 3/2003 | Marsh et al. | |
| 6,567,649 B2 * | 5/2003 | Souissi | 455/83 |
| 6,745,018 B1 | 6/2004 | Zehavi et al. | |
| 6,915,112 B1 | 7/2005 | Sutton et al. | |
| 6,968,171 B2 * | 11/2005 | Vanderhelm et al. | 455/296 |
| 7,058,368 B2 | 6/2006 | Nicholls et al. | |
| 7,123,676 B2 | 10/2006 | Gebara et al. | |
| 7,443,829 B2 | 10/2008 | Rizvi et al. | |
| 7,522,883 B2 | 4/2009 | Gebara et al. | |

OTHER PUBLICATIONS

Alan Waltho, et al. "Performance Analysis and Design Considerations for Multi-Radio Platforms." Intel Developer Forum. 82 pages.

* cited by examiner

*Primary Examiner* — Quochien B Vuong

(57) ABSTRACT

Embodiments of the invention may provide for reducing interference in the front-end of a communications receiver. The cancellation circuitry may be utilized in conjunction with a preliminary rejection filter for improved rejection of out-of-band interference from other radio services or circuitry. The cancellation circuit may be placed in parallel with the preliminary rejection filter and may enhance suppression at the interference frequency by matching the gain and phase of the preliminary rejection filter prior to subtracting the matched signal from the preliminary rejection filter output. The cancellation circuit need not necessary know beforehand the characteristics of the preliminary rejection filter, the interference source, or the coupling mechanism, as it may adapt to unknown or varying interferers by adapting the matching gain and phase values based on the output of the preliminary rejection filter at tap points occurring both before and after application of the cancellation signal.

20 Claims, 6 Drawing Sheets

SYSTEMS, METHODS, AND APPARATUSES FOR REDUCING INTERFERENCE AT THE FRONT-END OF A COMMUNICATIONS RECEIVING DEVICE

RELATED APPLICATION

The present application is a non-provisional application claiming priority to U.S. Provisional Application No. 61/293,319, filed Jan. 8, 2010, and entitled "SYSTEMS, METHODS, AND APPARATUSES FOR REDUCING INTERFERENCE AT THE FRONT-END OF A COMMUNICATIONS RECEIVING DEVICE", which is hereby incorporated by reference in its entirety as if fully set forth herein.

FIELD OF THE INVENTION

Embodiments of the invention relates generally to the field of communications, and more specifically to improving the quality or fidelity of a received signal by suppressing interference.

BACKGROUND OF THE INVENTION

Central to the operation of a radio communications device is receiving an electromagnetic radio frequency (RF) signal and decoding the data embedded in it. The RF signal can, however, be seriously degraded during signal transmission. For instance, the signal strength is attenuated as it travels through air, with the amount of attenuation generally increasing with the distance traveled, before consideration of multipath effects. The effect of signal loss is exacerbated by the noise and interference introduced into the signal along the communication path. The noise and interference can be particularly problematic when introduced at the receiver where the communicated signal is weakest, thereby resulting in low signal-to-noise-and-interference ratio (SNIR) conditions and making signal decoding difficult. In severe cases with low SNIR levels, the system can be prone to making decoding errors.

The problem of electromagnetic interference (EMI) is of interest because it can be considerably stronger than other noise sources and can thus be the dominant system impairment, or in other words, the active constraint limiting system performance. Such interference can arise from a variety of sources. One illustrative EMI source is other radio communications devices. As other radio devices transmit RF signals amongst themselves, their RF signals can also be received by other unintended devices. To these unintended devices, those RF signals can be nuisance interference. When such unintended signals are strong enough, they can overwhelm the desired received communications signal.

A second illustrative source of EMI is the communication of data along buses or traces, e.g. the sending of electrical signals along conductive or metal paths embedded in a dielectric, plastic, or other molding material. When a signal is transmitted at a high speed or high baud rate, a conductive trace or bus can active like antenna and emit electromagnetic radiation. This radiation may then be absorbed as EMI by an antenna or another bus or trace in the receive path of a communications device.

The problem of EMI has recently been garnering attention because of its root at the conflict between communications performance and prevalence of use. The use of communications devices and services is experiencing a growth explosion in services such as WiFi (IEEE 802.11), cognitive radio (IEEE 802.22), mobile phones (e.g. GSM, EDGE, CDMA, W-CDMA, WiMAX, LTE), global positioning service (GPS), Bluetooth, and mobile video (e.g. DVB, DMB, MediaFLO). The concurrent use of two or more of these services in close proximity, however, can cause one service to interfere with another. In some instances, multiple services can be supported on the same device where the physical distance between the radio antennae is very short (on the order of centimeters apart) or even share the same antenna such as in a GPS, mobile video, and WiFi enabled 3G mobile phone. On such a device, if a first service such as WiFi or WCDMA is transmitting while a second service such as GPS or DVB-H is receiving, then it can easily be the case where the transmitting first service signal is in excess of 10,000 times stronger than the receiving second service signal thus corrupting the receiving second service with overwhelming interference. A number of other illustrative interference scenarios in commercial applications, though not an exhaustive listing, can be found in the presentation "Performance Analysis and Design Considerations for Multi-Radio Platforms" by Waltho et al. delivered at the 2006 Intel Developers Forum.

The technological advancement of communications devices is being impeded by increased interference not only because of the number of radios used in a confined area but also because of the denser and faster signal routing in newer communications devices. As previously noted, a high-speed signal path can emit EMI that can be absorbed by a nearby radio receiver. Thus, even on devices where the radios are carefully controlled, e.g. there is no concurrent operation of multiple radio services, the operation of other non-radio aspects of the device during radio communication may pose a problem. For example, in a camera-enabled mobile phone, a ribbon cable bus between a processor and camera module may emit enough EMI to disrupt phone reception resulting in the interruption of an ongoing call or the missing of an incoming call.

EMI can impede the integration of wireless radio services and other technologies involving high-speed signal paths into a single, small form factor device. Consequently, there have been many efforts to address the problem of EMI in a communications receiver. Some of the conventional art has proposed the use of high quality filters to suppress out-of-band interferers (i.e., EMI whose frequency spectral coverage is disjoint from the spectrum utilized by the primary radio communications receiver). Such filters include surface acoustic wave (SAW), bulk acoustic wave (BAW), and film bulk acoustic wave resonator (FBAR) filters. While such filters offer very high suppression of out-of-band interferers, their use has at least two significant drawbacks. First, these high-quality filters commonly have undesirably high component costs, in terms of dollar pricing. Second, these filters often come as discrete components which are not integrated into other existing components on a communications receiver. Thus, their inclusion results in an increase in area utilization. Furthermore, the EMI problem is severe enough in many contexts that multiple filters have to be cascaded to provide adequate isolation, thus multiplying the price and area costs associated with that solution. Many consumer products, such as mobile phones, GPS receivers, and portable digital assistants, are highly sensitive to pricing and physical size and would be more marketable absent increases in these characteristics.

Another major group of efforts to reduce the impact of EMI are based on the principle of interference cancellation or suppression. The general principle of interference cancellation in the prior art is illustrated in FIG. 1 where a victim receiver 120, as part of a first radio communications system, is operating concurrently with an aggressing transmitter 110 as part of a second system, and the signal from the aggressing transmitter 110 couples into the receive signal path via the coupled signal 150. An active cancellation unit 130 samples the output from the aggressing transmitter 110 and applies a transformation (e.g. attenuation, delay, and/or phase shift), to mimic the transformation that occurs in the coupled signal 150. The victim receiver 120 then subtracts the output from the active cancellation unit 130 from the corrupted received signal. The resulting signal then has the interference removed to the degree that the output of the active cancellation unit 130 models the coupled signal 150.

The prior art in interference cancellation suffers from several major shortcomings. One significant drawback is the fundamental requirement that the active cancellation unit 130 senses (or equivalently taps or splits) the output of the aggressing transmitter 110 as proposed in U.S. Pat. No. 6,539, 204 by Marsh and Sutton, U.S. Pat. No. 6,915,112 by Sutton and Soledade, U.S. Pat. No. 6,745,018 by Zehavi et al., U.S. Pat. No. 7,123,676 by Gebara et al., and U.S. Pat. No. 7,522, 883 by Gebara et al. The model of the coupled interference signal 150 is generated by adjusting the amplitude, phase, and/or delay of the transmitter 110 output. Without such a sensing of the aggressing transmitter 110, the active cancellation unit 130 will not produce a meaningful model of the coupled interference signal 150, and consequently, will not be able to reduce the interference. However, such a sensing is highly undesirable and in many cases impossible. Indeed, it is undesirable to sense the aggressing transmitter 110 output because doing so can distort the signal transmitted from the antenna 140. In many applications, the signal launched from the antenna 140 must adhere to strict regulatory requirements such as a spectral mask, and systems designers take great steps to do so. However, the addition of a sensor on the transmit path could significantly alter the properties of the transmitted signal causing it to fail the requirements and thus necessitate a major, sometimes impractically laborious, redesign of the communications system. Thus, the addition of the sensor near transmitter 110 can preclude the active cancellation unit 130 from being added to an existing communications device design to alleviate a previously unanticipated EMI problem. Furthermore, in many instances, the aggressing transmitter 110 is either unknown or not on the same device as the victim receiver 120 thus making sensing impossible. An example of an unknown aggressing transmitter could be a high-speed bus or signal trace that emits EMI. In modern communications systems, there are myriad such buses that can cause problematic EMI and identification of the one or more offenders is impractical. Even if the offending EMI sources could be identified, it would likely be impractical to sense them because of routing complexities from the sensing point to the victim receiver.

While not requiring explicit sensing of the aggressing transmitter, some methods in the prior art still require prior coordination between the aggressing transmitter 110 and victim receiver 120. U.S. Pat. No. 7,443,829 by Rizvi et al. for example only cancels uplink interference in a CDMA based network. Such an approach is limited because it can only cancel interference from other CDMA signals, i.e. it does not mitigate interference from non-CDMA sources. Furthermore, among CDMA interference sources, that approach only cancels those that are received at the same basestation as the victim receiver. Such a cancellation technique is very limited in the types of communications systems to which it can benefit.

Another problem with methods for interference cancellation in the prior art pertains to those that require the aggressing transmitter 110 to have prior knowledge of the carrier frequency of the victim receive signal. Such an example of this is in U.S. Pat. No. 7,058,368 by Nicholls and Roussel where they cancel the interference at the source of the aggressing transmitter 110 by suppressing transmit energy over a specified bandwidth corresponding to the spectrum used by a victim receiver 120. In order to do this however, the spectrum band used by the victim receiver 120 must be known to the aggressing transmitter 110 in order for the latter to suppress energy in the proper band. Requiring such knowledge is undesirable because in many situations aggressor-victim pairs cannot be known ahead of time and are constantly changing. In particular, a potential aggressor 110 may not be able to know what victim radios 120 it will be aggressing. In fact, the aggressor 110 may not even be an explicit radio transmitter but may instead be a high-speed signal path or processor.

An additional problem with interference cancellation methods in the prior art relates to those that require modification of the aggressing transmit signal. For example, U.S. Pat. No. 6,539,204 by Marsh and Sutton, U.S. Pat. No. 6,745, 018 by Zehavi et al., U.S. Pat. No. 7,123,676 by Gebara et al., and U.S. Pat. No. 7,058,368 by Nicholls and Roussel propose the injection of a pilot or reference tone into the signal transmitted in or near the aggressing transmitter 110. The presence of the pilot signal is then used at the victim receiver 120 to identify the coupled aggressor signal 150 and guide the control of the cancellation unit 130 to maximize the degree of cancellation. The modification of the aggressing transmit signal however has several major drawbacks. First, modifying the aggressing transmit signal after the output of an aggressing transmitter 110 is likely to disturb the signal integrity of the transmitted signal. Such degradation may come in the form of loss of valuable signal power or in terms of signal distortion. These degradations can be severe enough to cause the signal to violate required signal criteria such as those imposed by spectral masks. If, however, the modification to the aggressing transmit signal is incorporated in the aggressing transmitter itself, then such an approach requires customized transmitters where the particular interference cancellation technique, aggressing transmitter, and victim receiver are all designed in a coordinated fashion. Such high degrees of customization are not practical for large scale adoption and the variety of interference pairings that can be encountered. Another drawback of modifying the transmitted aggressor signal is that doing so requires identification of and physical access to the interference source. As previously noted, in many contexts, the aggressing source is not known or not on the same device as the victim receiver and thus not available for modification.

Besides injecting a reference pilot tone into the transmitted aggressor signal prior to transmission over an antenna, a reference tone can be injected after reception by the victim receiver. Such an approach is promoted in U.S. Pat. No. 7,123,676 by Gebara et al. and U.S. Pat. No. 7,058,368 by Nicholls and Roussel. However, in order for such an approach to be effective, the victim receiver must use a pilot tone whose frequency is congruous with the frequency of the transmitted aggressor. In other words, the victim receiver must know the operating frequency of the aggressing transmitter in order to accurately set the tone of the reference pilot to provide good guidance for cancellation. Unfortunately, in many cases, the identity of the aggressing transmitter, and especially its operating frequency, is not known to the victim receiver. Furthermore, as known to those skilled in the art, the act of injecting a tone, or any other signal, into the received victim path can degrade the signal fidelity of the already weak and vulnerable received victim signal.

Avoiding the use of a pilot tone, an alternate approach for optimizing the parameters in an interference cancellation unit is to have the victim receiver 120 feed a signal fidelity measure back to the cancellation unit 130 to guide the adjustment of the cancellation parameters. For example, U.S. Pat. No. 6,915,112 by Sutton and Soledade and U.S. Pat. No. 7,123,676 by Gebara et al. proposed the minimization of a victim receiver's Received Signal Strength Indicator (RSSI) measure to guide the control of the cancellation unit. Use of such a signal, external to the cancellation unit, has several drawbacks. First, such an approach requires the delivery of the external fidelity measure from the receiver 120 to the cancellation unit 130. Oftentimes, such a fidelity measure is not available externally from the receiver 120 for such use, and even in cases where it is available, making use of the signal can be burdensome due to the extra routing or processing resources needed. Second, indirect measures such as received power or RSSI are not always indicative of interference power or lack thereof. For example, the amount of residual interference (after cancellation) may increase while the received victim power degrades due to a fading communications channel. In this case, the net result can be a decrease of total received signal power or RSSI in which case the cancellation unit will be misguided into believing that the amount of interference has been reduced because the cancellation unit has no means of determining the individual contributions of the received victim signal and the interference signal to the total signal power or RSSI.

Besides the inappropriateness of general fidelity measures for the control of an interference cancellation unit, many methods in the prior art propose the less than desirable optimization technique of trial-and-error coordinate descent optimization. For example, U.S. Pat. No. 6,915,112 by Sutton and Soledade and U.S. Pat. No. 7,123,676 by Gebara et al. propose to take a first fidelity measurement under a first set of cancellation parameters followed by a second fidelity measurement under a second set of parameters. Then, the set yielding the better fidelity measure is selected as the better set. This trial-and-error approach can be repeated until some stopping criterion is met, or it can be continued indefinitely. The drawback of trial-and-error coordinate descent minimization is that the cancellation unit is always forced to test a parameter set which will have an unknown and perhaps worse performance. It would be strongly preferred to use an optimization technique, such as a gradient descent-based technique, where from a single parameter set, one is able to determine how the parameters should be modified to improve fidelity, i.e. without the testing of a second set of parameters. It is well known to those skilled in the art of controls theory that gradient descent-like techniques outperform trial-and-error coordinate descent both in terms of resulting signal quality and the speed in which the optimum system parameters are achieved.

Some approaches in the prior art proposed to cancel signal interference on the baseband signal, i.e. after the signal has been modulated from its RF carrier down to a low frequency or DC carrier and quantized by an analog-to-digital converter (ADC). Such an approach is proposed in U.S. Pat. No. 6,539,204 by Marsh and Sutton, and U.S. Pat. No. 6,745,018 by Zehavi et al. because of the sophisticated digital signal processing techniques that can be used to remove interference. However, removing interference at the baseband level has several major drawbacks. Such an approach places extreme performance requirements on the front-end circuitry components of the receiver. In particular, when a weak received victim is in the presence of a strong interferer, the down-conversion mixer in the receiver will oftentimes further distort the signal as nonlinearities are introduced due to practical limitations on circuit linearity. Furthermore, because the interference signal is so much larger than the received victim signal, most of the dynamic range of the ADC is wasted to accommodate the large interferer. Thus, either very expensive high performance front-end circuit components are required or additional signal degradation is introduced. Thus, there is a need in the art for interference cancellation techniques that cancel the interference early in the front-end of the receiver before the down-conversion modulation or analog-to-digital conversion.

Accordingly, there is a need in the industry for systems, methods, and apparatuses for reducing interference at the front-end of a communications device to address one or more of the above-described deficiencies or yet other deficiencies.

BRIEF SUMMARY OF THE INVENTION

Embodiments of the invention may support reducing interference in a received communications signal without any prior knowledge of, sensing of, or modification to source of the interference or its feed path to a victim receiver. An example approach may control the adjustable parameters of the interference cancellation via self-contained internal control mechanisms requiring no direction from external sources for fidelity assessment or guidance. The example approach to interference cancellation may also enable a compact, self-contained solution to interference cancellation that is widely applicable and only requires modification to the front-end of a communications receiver.

According to an example embodiment of the invention, there is a method of reducing interference in a received communications signal. The method may include the example steps of: receiving a first corrupted communications signal comprising at least two signal components the first being the desired received communications signal and the other(s) being one or more interferers not in the same frequency band as the first signal component; filtering the first corrupted signal with a first filter providing an initial level of suppression of the interferer(s); tapping off a small fraction (less than one half) of power of the first received corrupted signal prior to the first filtering to yield a second corrupted signal; applying a second filtering comprising a phase shift and amplification (including attenuation by means of an amplification by less than one in magnitude) to the second corrupted signal to yield a correction signal; injecting the correction signal after the output of the first filter to yield a compensated signal; adjusting the phase shift and amplification applied in the second filtering to minimize the presence of the interference in the compensated signal.

Embodiments of the invention may reduce interference at the front-end of a communications receiver, thus reducing nonlinearity problems caused by high SNIR in down-converting mixers, ADCs, and other elements further down the receiver processing chain. Furthermore, the embodiments of the invention may not require any modification of, interaction with, or prior knowledge of the transmitting interferer.

In an example embodiment of the invention, the first filter can be one of a SAW, FBAR, or BAW filter. Likewise, by placing the second filter in parallel with the first filter, a low-cost solution may be achieved. In an alternative embodiment, the second filter can be embedded into a module also housing the first filter. Accordingly, such embedding or integration may reduce the component count and area occupied on a communications receiver. In another example embodiment, the second filter can otherwise be embedded into a low-noise-amplifier (LNA). Such a solution could likewise reduce the component count and area occupied on a communications receiver.

In an alternative embodiment, the operation of injecting the correction signal after the output of the first rejection filtering can be done in an LNA. Such a solution could reduce the noise figure degradation from the injection and also reduce the component count and area occupied on communications receiver.

According to an example embodiment of the invention, the phase shift applied in the second filter can be adjusted by a method comprising the example steps of: setting an adjustable phase shift element to a first phase shift value; tapping off the output of the phase shift element to generate a first phase reference signal; tapping off the signal path anywhere between the output of the first filter and the input to the injection point, inclusively, to generate a second phase reference signal; comparing the two phase reference signals to generate a phase correction signal indicative of the phase mismatch between the two reference signals; generating an updated phase shift value by modifying the first phase shift value in accordance with the value of the phase correction signal; replacing the first phase shift value with the updated phase shift value; and repeating the steps using the newly updated phase shift value as the first phase shift value.

In an example embodiment of the invention, the phase shift correction signal may be generated from the first phase shift value and may not require testing of a second phase shift value for comparative purposes to derive the phase correction signal. This may enable embodiments of the invention to adapt quickly and precisely.

According to another example embodiment of the invention, a gain applied in the second filter can be adjusted by a method comprising the steps of: setting an adjustable gain element to a first gain value; tapping off the input of the gain element to generate a first gain reference signal; tapping off the compensated signal, i.e. the signal path after the output of the injection point, to generate a second gain reference signal; comparing the two gain reference signals to generate a gain correction signal indicative of the amplitude mismatch between the two reference signals; generating an updated gain value by modifying the first gain value in accordance with the value of the gain correction signal; replacing the first gain value with the updated gain value; and repeating the steps using the newly updated gain value as the first gain value.

In an example embodiment of the invention, the gain correction signal may be generated from the first gain value and may not require testing of a second gain value for comparative purposes to derive the gain correction signal. This may enable embodiments of the invention to adapt quickly and precisely.

In a example embodiment of the invention, the adjustable phase shift block or element precedes the adjustable gain block or element. In such an arrangement, both of the phase reference signals may be unaffected by the adjustable gain value. Accordingly, the phase shift and gain can be adapted simultaneously without conflicting feedback loops, thereby allowing for faster convergence of the phase and gain parameters.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. In other instances, well known methods, procedures, components, and circuits have not been described in detail. Like numbers refer to like elements throughout.

Operating Environment Overview.

Figure 1:
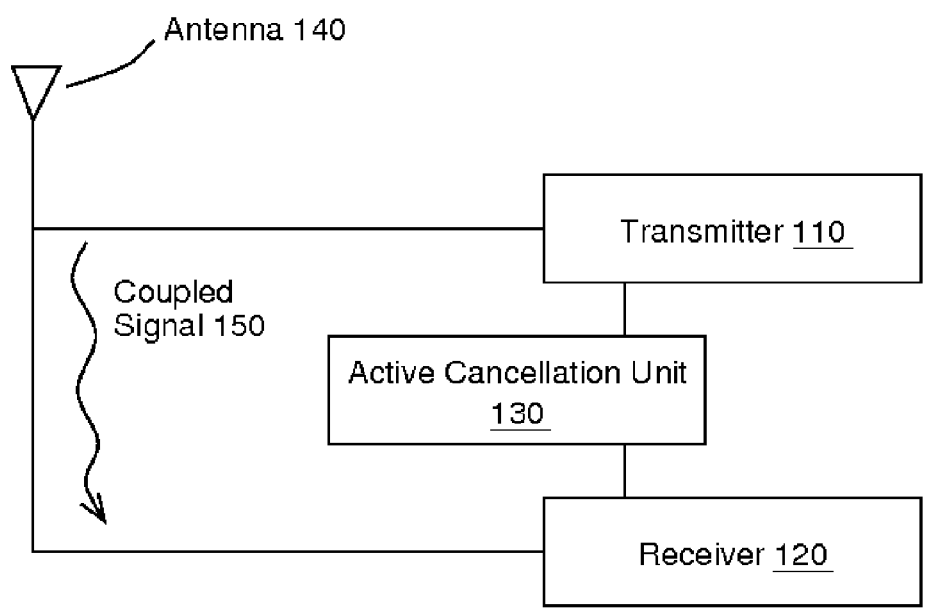
FIG. 1 illustrates a general context in which interference cancellation has been applied in the conventional art.
Figure 2:
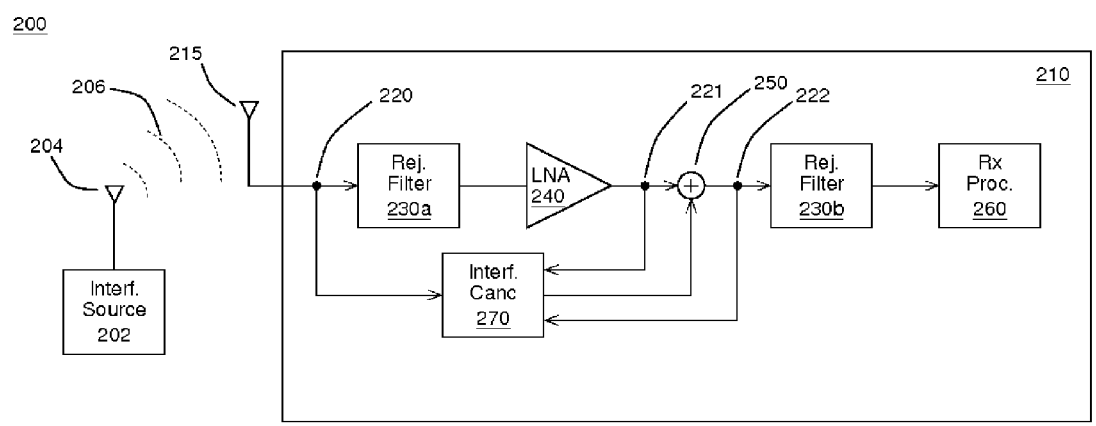
FIG. 2 illustrates an example of a system that support interference cancellation in accordance with an example embodiment of the invention.

FIG. 2 illustrates an example of a system 200 that support interference cancellation in accordance with an example embodiment of the invention. The system 200 may include a communications receiver 210 and interference source 202. The interference source 202 may be one or more mechanisms for producing an interference signal, including, but not limited to, a communications transmitter, processor, or integrated circuit) that generates the underlying interference signal. The interference signal generated by the interference source 202 may be radiated by a radiating element 204 (e.g., an antenna, signal trace, conductive path, etc.) into a medium such as air, dielectric on a circuit board, or circuit substrate, thereby creating a coupled signal 206. The coupled signal 206 may be undesirably picked up by a receiver antenna (or alternatively a signal trace in the receive signal path) 215 and corrupts a received victim signal (e.g., a desired signal) that is intentionally picked by the receiver antenna 215. Both the received interference and received victim signal may be delivered to the communications receiver 210 as a single, corrupted received signal. In an alternative embodiment of the invention, radiating element 204 and antenna 215 may be implemented as a shared antenna between two or more radio services operating at different carrier frequencies.

In accordance with an example embodiment of the invention, the received corrupted signal may be processed according to a main receive path. The main receive path may include a receiver (Rx) processor 260 that demodulates the received signal and performs baseband processing. However, the received corrupted signal may also be pre-processed in the main receive path with additional RF processing blocks (e.g., first rejection filter 230a, low-noise amplifier (LNA) 240, second rejection filter 230b) shown in FIG. 2 to improve signal fidelity. In particular, a rejection filter 230a may be utilized to suppress interference outside the defined frequency band of the desired received signal. In an example embodiment of the invention, the rejection filter 230a may be a narrowband filter or a bandpass filter. The rejection filter 230a may be implemented as a surface acoustic wave (SAW) filter, a bulk acoustic wave (BAW) filter, a film bulk acoustic wave resonator (FBAR) filter, a Micro-Electro-Mechanical systems (MEMs) filter, or a lumped element filter, according to an example embodiment of the invention. After the initial rejection filtering by the rejection filter 230, the filtered signal may be amplified with a low-noise amplifier (LNA) 240 to improve signal strength and signal-to-noise ratio (SNR) characteristics for subsequent analog processing. It will be appreciated that LNA 240 can be incorporated into the receiver processor 260 rather than being implemented as a discrete device, according to an example embodiment of the invention. In strong interference environments such as in multifunction mobile communications handsets, the communications receiver 210 may also utilize a second rejection filter 230b (for additional out-of-band suppression) following the LNA 240, as the rejection provided by the first rejection filter 230a may not suppress enough of the interference by itself. The second rejection filter 230b may be one or more of a SAW, FBAR, BAW, or lumped element filter, according to an example embodiment of the invention.

In an example embodiment of the invention, an interference cancellation device 270 can additionally be provided in a path parallel to the main receive path discussed above. To provide the parallel path, a signal tap 220 may be included on the main signal path prior to the input of the first rejection filtering 230a. The signal tap 220 may be implemented using a resister, an attenuator, splitter, capacitor, coupler, or directional coupler, according to an example embodiment of the invention. The signal tap 220 may divert a small amount or portion (e.g., less than one half or another portion) of the received corrupted signal power into an input of the interference cancellation device 270. The interference cancellation device 270 may then modify its input signal by applying an amplification (including attenuation as a special case by using an amplification factor of less than one in magnitude) and phase shift, as described herein. This modified signal may then be output by the interference cancellation device 270 as a correction signal and injected back into the main path via the combiner or summation node 250. The combiner or summation node 250 takes as a first input, the correction signal output by the interference cancellation device 270, and as the second input, the main path signal at some point after the output of the first rejection filter 230a, to produce a compensated victim signal with a reduced interference component, as compared to the originally received corrupted receive signal.

It will be appreciated that the location of the combiner or summation node 250 with respect to an optional LNA 240 may be varied without departing from example embodiments of the invention. For example, in one example embodiment of the invention, the combiner or summation node 250 may be placed after the LNA 240 such that the second input of the combiner or summation node 250 may be the amplified output of the LNA 240. By applying LNA amplification prior to summation by combiner or summation node 250, the noise figure of the front-end may be minimized, according to an example embodiment of the invention.

In an alternative embodiment of the invention, the combiner or summation node 250 may be placed before the LNA 240 such that the second input of the summation node may be taken as the filtered output signal of the first rejection filter 230a and the output of the combiner or summation node 250 may be taken as the input to the LNA 240. According to this embodiment, the LNA 240 input may have a higher signal-to-interference ratio (SIR), thereby providing an opportunity to relax the linearity requirements of the LNA 240.

In addition to splitting or tapping the received corrupted signal at a signal tap 220 prior to an input of the first rejection filter 230a, the interference cancellation device 270 may also split or tap the main path signal at a signal tap 221 that is after the output of the first rejection filter 230a and prior to the second input of the combiner or summation node 250. Furthermore, another signal tap 222 may be taken after the output of the summation node and fed to the interference cancellation device 270. As described herein, the signals from these taps 220, 221, 222 may be used by the interference cancellation device 270 to control the adaptation of its adjustable phase shift and amplification settings. Like signal tap 220, signal taps 221 and 222 may divert only a small amount or portion (e.g., less than one half or another portion) of the signal power from the main path in order to minimally disturb the signal integrity of the main path signal. In an example embodiment of the invention, the signal taps 221 and 222 may be implemented using a resister, attenuator, splitter, capacitor, coupler, or directional coupler, according to an example embodiment of the invention.

It will be appreciated that while the LNA 240 and second rejection filter 230b are illustrated as part of the communications receiver 210 in FIG. 2, they are optional and either or both can be omitted without departing from example embodiments of the invention. Indeed, with adequate interference cancellation, the use of the interference cancellation device 270 may obviate the otherwise necessary second rejection filter 230b, thus enabling a less expensive and more compact solution. Furthermore, it will be appreciated that the blocks in FIG. 2 are listed to facilitate the operation of an embodiment of the invention and need not be implemented as individual discrete devices. In an example embodiment of the invention, an integrated circuit may comprise one or more of an LNA 240, interference cancellation device 270, signal tap 221, combiner or summation node 250, and signal tap 222. In an alternative embodiment of the invention, a filtering module may be comprised of a rejection filter 230a, and interference cancellation device 270. Indeed, one or more of the following elements may be combined into a single integrated circuit or module without departing from example embodiments of the invention: signal tap 220, rejection filter 230a, LNA 240, signal tap 221, combiner or summation node 250, tap point 222, interference cancellation device 270, and receiver processor 260.

Figure 3:
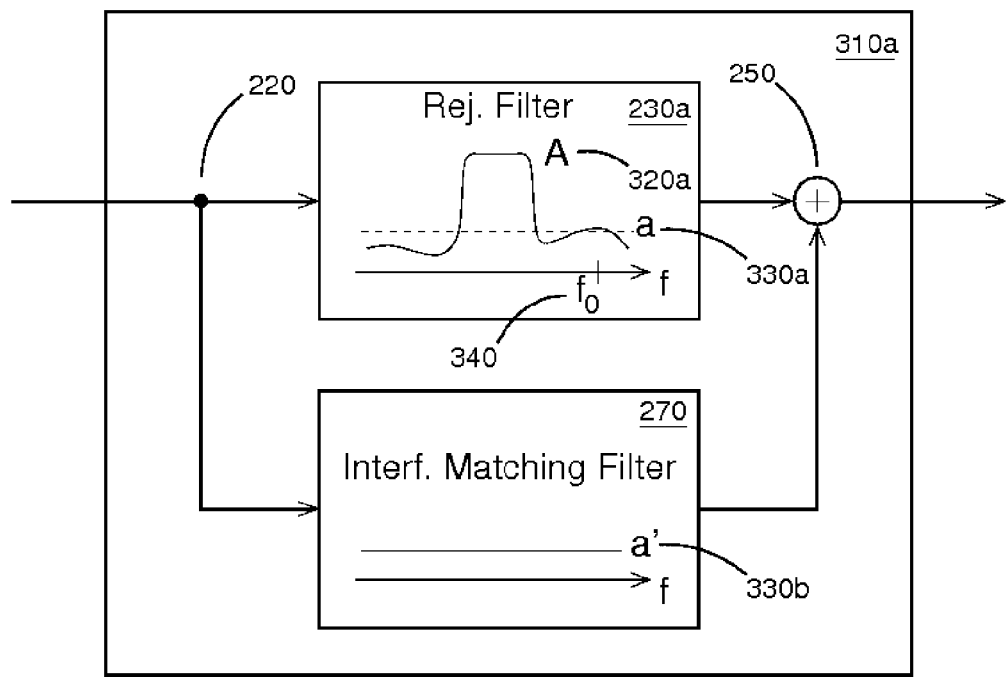
FIG. 3 illustrates the frequency response of various aspects of a communications receiver, according to an example embodiment of the invention.
Figure 3:
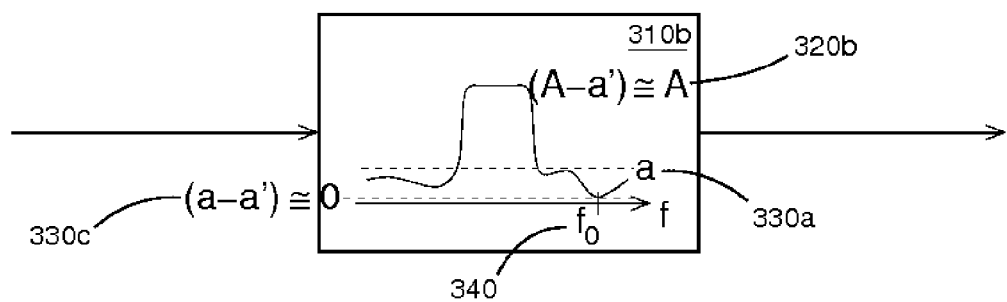

A high level operation of the example cancellation-enabled receiver 210 of FIG. 2 may be understood with the simplified illustration in FIG. 3, where the simplified system 310a comprises a representative first rejection filter 230a, signal tap 220, interference cancellation device 270, and combiner or summation node 250. The first rejection filter 230a may be a narrow bandpass filter with passband gain "A" 320a for the victim signal and stopband gain "a" 330a at interferer frequency $f_0$ 340 with the value of "A" being much larger than the value of "a". The interference cancellation device 270 applies a gain of "a'" 330b that approximates "a" 330a and with the opposite phase. The composite effect of system 310a is then illustrated in the equivalent system 310b where several attributes may be observed. First because "A" 320a is much larger than "a'" 330b, the difference in the composite passband "A-a'" 320b is approximately "A", i.e. the passband response is largely preserved. Second, because "a'" 330b approximates "a" 330a, the difference "a-a'" 330c is approximately zero at the interferer frequency $f_0$ 340 (but not necessarily elsewhere because the phase may not match). In other words, the cancellation-enabled system 310 has higher suppression at the interferer frequency than the first rejection filter 230a alone. Furthermore, the operative frequency for cancellation can be varied by changing the gain and phase response of the interference cancellation device 270 to match those of the first rejection filter 230*a* at the operative interference frequency.

Interference Cancellation Device Architecture.

Figure 4:
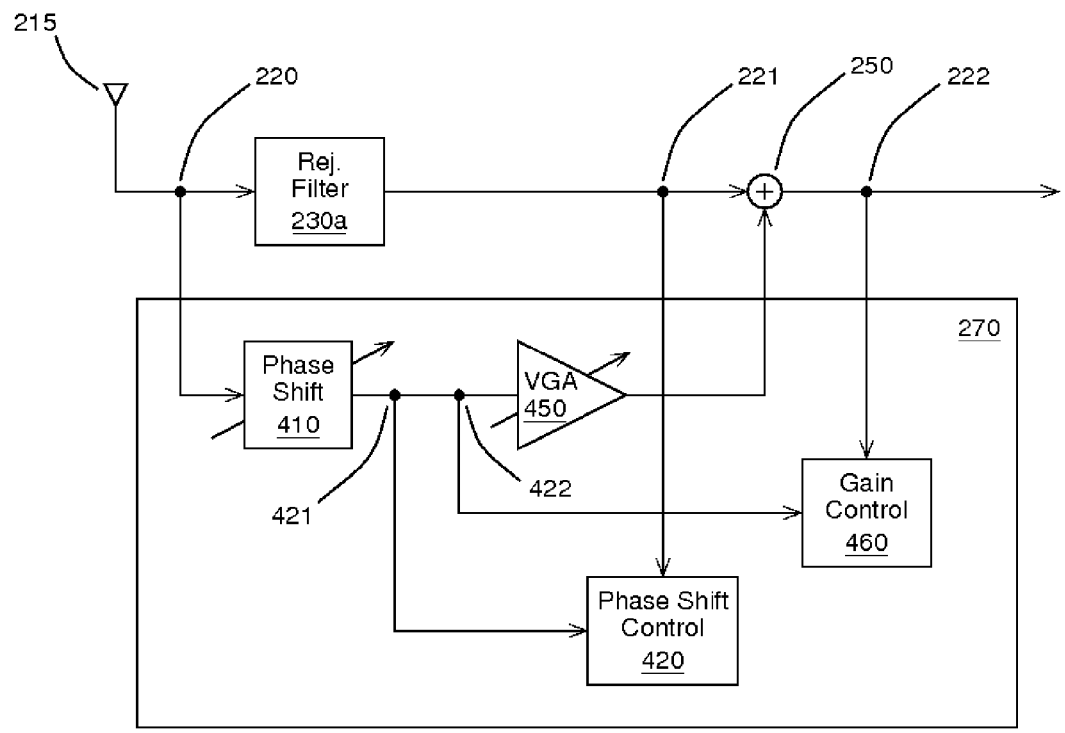
FIG. 4 illustrates an architecture for an example interference cancellation device, according to an example embodiment of the invention.

The ability of the cancellation-enabled receiver 210 to suppress interference may be based at least in part on the ability of the interference cancellation device 270 to match the gain and phase response of the first rejection filter 230*a* at the frequency of the interference source 202. FIG. 4 shows an architecture for an example interference cancellation device 270 to achieve such matching of the gain and phase response, according to an example embodiment of the invention. In order to provide flexibility (e.g., for both interferer type and variation), the interference cancellation device 270 may use a variable phase shift block 410 and a variable gain amplifier (VGA) 450 which can adapt to the interferer at hand, including the absence of an interferer. In particular, the variable phase shift block 410 may be controlled so that at the frequency of the interference signal, the output of phase shift block 410 is driven to either about 0 degrees in-phase (for in-phase synchronization) or about 180 degrees out-of-phase (for out-of-phase synchronization) with respect to the second input of the combiner or summation node 250 from the first rejection filter 230*a*. Consequently, the phase shift block 410 may be referred to as a synchronizing phase shift block. It will be appreciated that the synchronizing phase shift block 410 may perform adaptive phase adjustment using narrowband phase shifting by a phase shifter, a delay by a time-delay block, low-pass filtering by a low-pass filter, or band-pass filtering by a band-pass filter.

Following phase adjustment by the synchronizing phase shift block 410, gain adjustment may be performed by the VGA 450. More specially, the VGA 450 may be adjusted so that its correction signal output, i.e. the first input to the combiner or summation node 250, maximally cancels the interference signal in the second input to the combiner or summation node 250. In particular, the VGA 450 may adjust the gain for maximum cancellation using a positive gain if phase shift block 410 produced an out-of-phase synchronization or a negative gain if the phase shift block 410 produced an in-phase synchronization (e.g., so that the correction signal output can be effectively subtracted from the filtered main path signal).

The particular phase shift value used by the synchronizing phase block 410 may be adaptively controlled by the phase shift control block 420. The phase shift control block 420 may take two phase reference signals as inputs, as illustrated in FIG. 4. The first phase reference signal may be taken from the output of the synchronizing phase shift block 410 via a first phase reference tap 421. The second phase reference signal may be taken as a tap off from the second input to the combiner or summation node 250 (e.g., filtered main path signal) via a second phase reference tap 221. The phase shift control block 420 may then adjust the synchronizing phase value (e.g., value of the phase shift) in the synchronizing phase block 410 to align the first and second phase reference signals, i.e. the signal from taps 421 and 221, respectively. In the case where the received corrupted victim signal is impaired by a strong interferer, this interferer will dominate the characteristics of the first phase reference signal (from the output of synchronizing phase block 410), and hence, aligning the first and second phase reference signals will largely correspond to aligning the phase shifted interferer components in the two signals, according to an example embodiment of the invention.

The operational blocks of the phase shift control block 420 of FIG. 4 are illustrated in more detail with reference to FIG. 5. To synchronize the first phase reference signal from tap 421 with the second phase reference signal from tap 221, the first phase reference signal is initially phase shifted with a calibration phase shift block 510 by a calibration phase shift value. The output of the calibration phase shift block 510 may then be mixed or multiplied by a first mixer 520*a* with the negative of the second phase reference signal from signal tap 221. The output of the first mixer 520*a* may then be integrated or accumulated by a first integrator 540*a* (e.g., a lossy integrator). The output of the first integrator 540*a* (or equivalently a value proportional to it) may be then taken as the phase shift value (which may also be referred to as the "synchronizing phase shift" value) applied by the synchronizing phase shift block 410. Such an example control loop may adjust the sum of the synchronizing phase shift value (for phase shift adjustment in block 410) and the calibrating phase shift value (for phase shift adjustment in block 510) to be such that the output of the calibration phase shift block 510 may be orthogonal to the second reference phase signal from the second phase reference tap point 221. In other words, once the control loop has converged, the signal output from the calibration phase shift block 510 may either be about +90 degrees or about −90 degrees out of phase from the second phase reference signal from tap point 221. Consequently, if the value of the calibrating phase shift in the calibrating phase shift block 510 corresponds to an odd integer multiple of 90 degrees at the interferer carrier frequency (e.g. 90°, 270°, 450°, etc.), then the first phase reference signal from tap point 421 may be an integer multiple of 180 degrees (e.g. 0°, 180°, 360°, etc.) out of phase with the second phase reference signal, as desired. In other words, the first and second phase reference signals may either be 0° in-phase or 180° out-of-phase with each other when the output of the first integrator 540*a* has converged.

It will be appreciated that the negation (or 180° phase shift) applied on the second phase reference signal (from signal tap 221) input into the first mixer 520*a* can be applied anywhere along the processing chain without departing from example embodiments of the invention. For example, it can alternatively be applied on the input to the calibration phase shift block 510, either input of the first mixer 520*a*, or the input or output of the first integrator 540*a*. The negation may be performed by a variety of means known in the art such as a negative gain in an amplifier, an inverter, an interchanging of lines in a differential pair, or a negation calculation in a processor.

If the carrier frequency of the interferer is known and the value of the calibrating phase shift can be precisely set, then the calibrating phase shift (for block 510) can be fixed to a value corresponding to a 90° phase shift at the interferer frequency. However, this is not always the case. In particular, the carrier frequency of the interferer may not always be known by the system in advance and furthermore, it may difficult to precisely set the value of the calibrating phase shift when subject to realistic variations in the circuit fabrication process, supply voltage, and temperature. Thus, the calibrating phase shift block 510 may be adaptive to automatically converge to a value corresponding to a 90 degree phase shift of the interferer.

An example embodiment of the phase shift control block 420 may include a second control loop in the phase shift control block 420 to adapt the value of the calibrating phase shift in the calibration phase shift block 510. In particular, the first phase reference signal from tap 421 may be negated and mixed or multiplied by a second mixer 520 with the output of the calibration phase shift block 510. The output of the second mixer 520b may be integrated or accumulated by a second integrator 540b. The output of the second integrator 540b (or equivalently a value proportional to the output) is then taken as the value of the calibrating phase shift. Such a control loop may converge to a state where the value of the calibrating phase shift corresponds to an odd integer multiple of 90 degrees. It will be appreciated that the convergence behavior of the calibrating phase shift value may be independent of any variation of (or lack thereof) the synchronizing phase shift value. Consequently, both the calibrating and synchronizing phase shift control loops can operate simultaneously, if desired.

It will be appreciated that the negation applied on the first phase reference signal input into the second mixer 520b can be applied anywhere along the processing chain without departing from example embodiments of the invention. For example, it can alternatively be applied on the input to the calibration phase shift block 510, either input of the second mixer 520b, or the input or output of the second integrator 540b, according to an example embodiment of the invention. The negation may be performed by a variety of means known in the art such as a negative gain in an amplifier, an inverter, an interchanging of lines in a differential pair, or a negation calculation in a processor.

Figure 5:
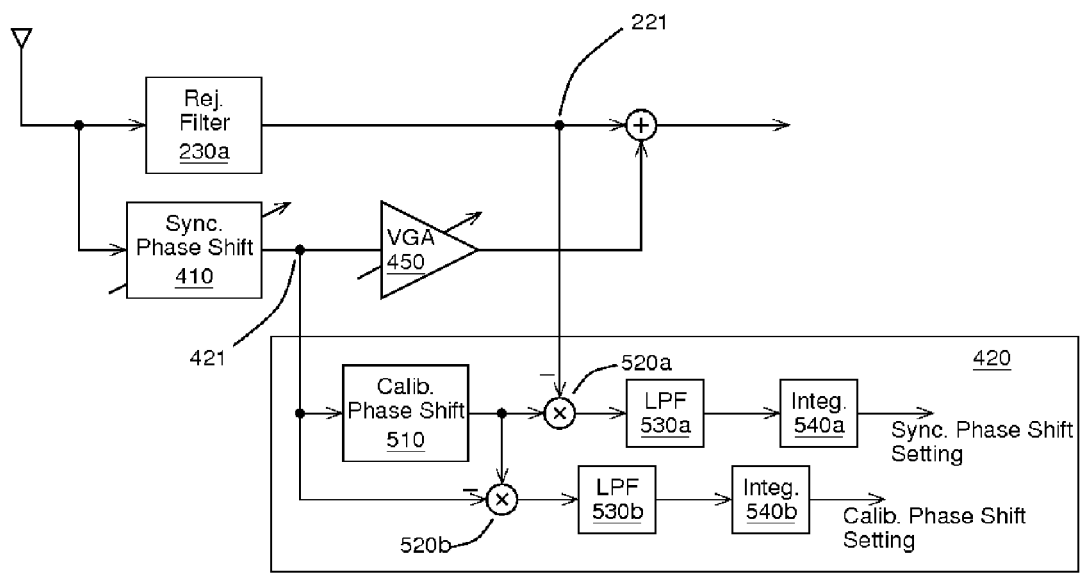
FIG. 5 illustrates functional blocks comprising a phase shift control block, according to an example embodiment of the invention.

In an example embodiment of the invention, the bandwidth requirements of the integrators 540a, 540b can be relaxed by the inclusion of preceding respective low-pass filters 530a, 530b on the output of the respective mixers 520a, 520b as shown in FIG. 5. Besides permitting a simpler design for the integrators 540a, 540b, the use of the low-pass filters 530a, 530b can also reduce fluctuations in the values of the synchronizing and calibrating phase shifts.

Referring back to FIG. 4, the particular gain value used by the VGA 410 may be adaptively controlled by the gain control block 460. The gain control block 460 may takes two reference signals as inputs, as illustrated in FIG. 4. A first gain reference signal may be taken as a tap from the output of the synchronizing phase shift block 410 via a first gain reference tap 422. A second gain reference signal is taken as a tap from the output of the combiner or summation node 250 via a second gain reference tap point 222. The gain control block 460 may then adjust the gain value in the VGA 450 to decorrelate the first and second gain reference signals, i.e. to make the first and second gain reference signals linearly independent. In other words, the VGA 450 gain may be adjusted so that the signal output from the synchronizing phase shift block 410 may maximally removed from the compensated signal at the output of the combiner or summation node 250.

The operational blocks of the gain control block 460 are described in more detail with reference to FIG. 6. To decorrelate the first gain reference signal off of tap 422 from the second gain reference signal off of signal tap 222, the first gain reference signal (from tap 422) is negated and mixed or multiplied by a mixer 610 with the second gain reference signal (from signal tap 222). The output of the mixer 610 may then be integrated or accumulated by an integrator 630. The output of the integrator 630 (or equivalently a value proportional to it) may then be taken as the gain value applied by the VGA 450. Such a control loop will adjust the VGA gain to be such that the first and second gain reference signals are decorrelated.

It will be appreciated that the negation applied on the first gain reference signal input into the mixer 610 can be applied anywhere along the processing chain without departing from example embodiments of the invention. For example, it can be applied on either input of the mixer 610, or the input or output of the integrator 630, according to an example embodiment of the invention. The negation may be performed by a variety of means known in the art such as a negative gain in an amplifier, an inverter, an interchanging of lines in a differential pair, or a negation calculation in a processor.

Figure 6:
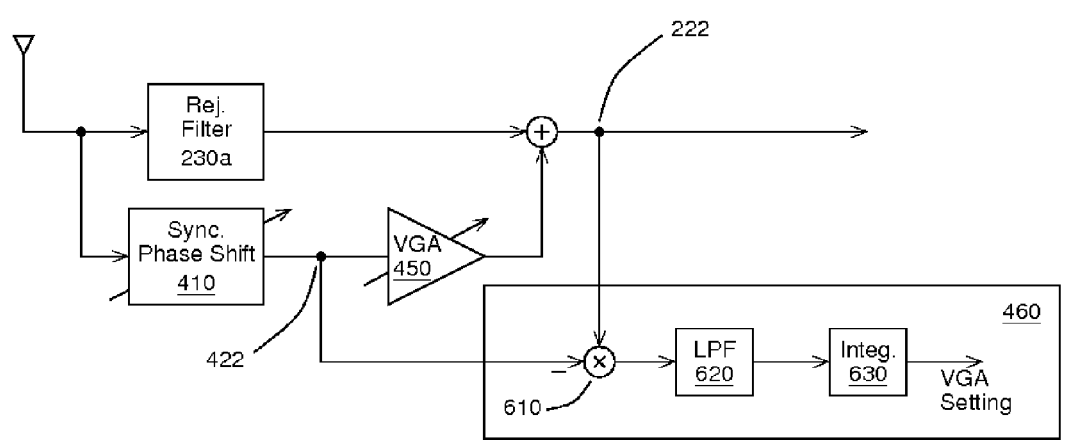
FIG. 6 illustrates functional blocks comprising a gain control block, according to an example embodiment of the invention.

In an example embodiment of the invention, the bandwidth requirements of the integrator 630 can be relaxed by the inclusion of a preceding low-pass filter 620 on the output of the mixer 610 as shown in FIG. 6. Besides permitting a simpler design for the integrator 610, the use of the low-pass filter 620 may also reduce fluctuations in the value of the VGA gain.

In an example embodiment of the invention, the tap 421 for the first phase reference and the tap 422 for the first gain reference may be taken after phase shift block 410 but prior to the VGA 450, as illustrated in FIG. 4. However, it will be appreciated that the order in which the first phase reference tap point 421 and first gain reference tap point 422 are taken is immaterial. For example, the first phase reference tap 421 may preceded or follow the first gain reference tap 422. Furthermore, the first phase reference tap 421 may be taken off of the first gain reference line or similarly, the first gain reference tap 422 may be taken off of the first phase reference line, according to an example embodiment of the invention. As another alternative, a single tap point may be used for tapping both the first gain reference line and the first phase reference line.

In an alternative embodiment of the invention, the first phase reference tap point 421 may be taken after the output of the gain block 450. In such a case, any phase response introduced by the gain block 450 may be included in the synchronization. However, doing so may also create the possibility of coupling of the phase shift control and gain control feedback loops and may impair parameter convergence to the optimum values.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for reducing interference, comprising:
receiving a corrupted receive signal comprising a received victim signal component and an interference signal component;
tapping or splitting the corrupted receive signal into a main path signal and a cancellation path signal;
filtering the main path signal with a rejection filter to generate a filtered main path signal;
applying phase adjustment and gain adjustment to the cancellation path signal to generate a correction signal; and
combining the filtered main path signal and the correction signal to generate a compensated signal, the compensated signal having a reduced amount of the interference signal component compared to the corrupted receive signal;
wherein the applied phase adjustment is configured based upon a first phase reference signal and a second phase reference signal, the first phase reference signal obtained from the cancellation path signal following the applied phase adjustment, the second phase reference signal obtained from the filtered main path signal;

wherein the applied gain adjustment is configured based at least in part upon a first gain reference signal and a second gain reference signal, the first gain reference signal obtained from the cancellation path signal, the second gain reference signal obtained from the compensated signal.

2. The method of claim 1, wherein the compensated signal is delivered to a receiver for data decoding or reception.

3. The method of claim 1, wherein the rejection filter includes one or more of a narrowband filter or a bandpass filter.

4. The method of claim 3, wherein the preliminary rejection filter is a surface acoustic wave (SAW) filter, a bulk acoustic wave (BAW) filter, a film bulk acoustic wave resonator (FBAR) filter, a Micro-Electro-Mechanical systems (MEMs) filter, or a lumped element filter.

5. The method of claim 1, wherein the phase adjustment is performed by one or more of a narrowband phase shifter, a time delay block, a low-pass filter, or a band-pass filter.

6. The method of claim 1, wherein first gain reference signal is obtained from the cancellation path signal prior to applying the gain adjustment.

7. The method of claim 1, wherein the first gain reference signal is obtained from the cancellation path signal subsequent to applying the gain adjustment.

8. The method of claim 1, wherein the application of the phase adjustment precedes the application of the gain adjustment in the cancellation path.

9. The method of claim 1, wherein the phase adjustment is applied to the cancellation path signal to generate a phase-adjusted cancellation path signal, wherein the gain adjustment is applied to the phase-adjusted cancellation path signal to generate the correction signal.

10. The method of claim 1, wherein the first gain reference signal and the first phase reference signal are a same signal.

11. The method of claim 1, wherein the filtered main path signal is amplified by a low-noise amplifier (LNA) prior to combining the filtered main path signal and the correction signal, wherein second phase reference signal is obtained from an output of the LNA.

12. The method of claim 1, wherein a summation node is used to combine the filtered main path signal and the correction signal, wherein the summation node is incorporated into a low-noise amplifier (LNA) or the rejection filter.

13. The method of claim 1, wherein the tapping or splitting of the corrupted received signal is performed by an integrated module containing the rejection filter.

14. A system for reducing interference, comprising:
a signal tap that splits or taps a corrupted receive signal into a main path signal and a cancellation path signal;
a rejection filter that filters the main path signal to generate a filtered main path signal;
an interference cancellation block that applies phase adjustment and gain adjustment to the cancellation path signal to generate a correction signal; and
a summation node that combines the filtered main path signal and the correction signal to generate a compensated signal, the compensated signal having a reduced amount of an interference signal compared to the corrupted receive signal,
wherein the applied phase adjustment is configured based upon a first phase reference signal and a second phase reference signal, the first phase reference signal obtained from the cancellation path signal following the applied phase adjustment, the second phase reference signal obtained from the filtered main path signal,
wherein the applied gain adjustment is configured based at least in part upon a first gain reference signal and a second gain reference signal, the first gain reference signal obtained from the cancellation path signal, the second gain reference signal obtained from the compensated signal.

15. The system of claim 14, wherein the rejection filter includes one or more of a narrowband filter or a bandpass filter.

16. The system of claim 14, wherein the interference cancellation block includes a variable phase shift block for applying the phase adjustment, and a variable gain amplifier (VGA) for applying the gain adjustment, wherein the first gain reference signal is obtained from either an input of the variable gain amplifier or an output of the variable gain amplifier.

17. The system of claim 14, wherein the interference cancellation block includes a variable phase shift block for applying the phase adjustment, and a variable gain amplifier (VGA) for applying the gain adjustment, wherein the phase adjustment is applied by the variable phase shift block to the cancellation path signal to generate a phase-adjusted cancellation path signal, and wherein the gain adjustment is applied by the VGA to the phase-adjusted cancellation path signal to generate the correction signal.

18. The system of claim 14, further comprising:
a low-noise amplifier (LNA) that amplifies the filtered main path signal to generate an amplified main path signal, wherein the amplified main path signal is combined with the correction signal by the summation node to generate the compensated signal, wherein the second phase reference signal is obtained from an output of the LNA.

19. The system of claim 14, wherein the summation node is incorporated into a low-noise amplifier (LNA) or the rejection filter.

20. The system of claim 14, wherein an integrated module includes both the tap and the rejection filter.

* * * * *